(12) United States Patent
Sysouphat (10) Patent No.: US 10,833,382 B2
(45) Date of Patent: Nov. 10, 2020

(54) RF STRUCTURE AND A METHOD OF FORMING AN RF STRUCTURE

(71) Applicant: BAE Systems Australia Limited, Edinburgh, South Australia (AU)

(72) Inventor: Andrew James Sysouphat, Edinburgh (AU)

(73) Assignee: BAE Systems Australia Limited, Edinburgh (AU)

( * ) Notice: Subject to any disclaimer, the term of this patent is extended or adjusted under 35 U.S.C. 154(b) by 90 days.

(21) Appl. No.: 15/761,661

(22) PCT Filed: Sep. 26, 2016

(86) PCT No.: PCT/AU2016/050903
§ 371 (c)(1),
(2) Date: Mar. 20, 2018

(87) PCT Pub. No.: WO2017/049367
PCT Pub. Date: Mar. 30, 2017

(65) Prior Publication Data
US 2018/0366800 A1    Dec. 20, 2018

(30) Foreign Application Priority Data
Sep. 25, 2015    (AU) .................... 2015903914

(51) Int. Cl.
*H01P 1/207* (2006.01)
*H01P 11/00* (2006.01)
(Continued)

(52) U.S. Cl.
CPC ............ *H01P 1/207* (2013.01); *B22F 3/1055* (2013.01); *H01P 1/022* (2013.01); *H01P 5/024* (2013.01);
(Continued)

(58) Field of Classification Search
CPC ........ H01P 1/022; H01P 1/207; H01P 11/002; H01P 5/024; H01Q 21/064; B33Y 70/00; B33Y 80/00; Y02P 10/295; B22F 3/1055
(Continued)

(56) References Cited

U.S. PATENT DOCUMENTS 5,329,687 A * 7/1994 Scott ..................... H01P 1/205
29/527.2
6,392,506 B2 * 5/2002 Wulff ................... H01P 1/2136
333/134
(Continued)

OTHER PUBLICATIONS

International Search Report and Written Opinion of International Application No. PCT/AU2016/050903, dated Dec. 12, 2016, 15 pages.
(Continued)

*Primary Examiner* — Robert J Pascal
*Assistant Examiner* — Jorge L Salazar, Jr.
(74) *Attorney, Agent, or Firm* — Maine Cernota & Rardin (57) ABSTRACT

A method is provided for manufacturing RF structures such as waveguides using additive manufacturing such as 3D printing. RF structures are also provided suitable for manufacturing with said method. The RF structures include waveguides and antenna assemblies manufactured using the additive process. The structures include flanges at the ends of the waveguide and the flanges are integrally manufactured with the said manufacturing process. The structures include a participating conductive surface that is formed on the entirety of an interior of the body, where the conductive surface extends continuously between the two ends and has been subjected to a surface modification process.

18 Claims, 5 Drawing Sheets

(51) Int. Cl.
*H01P 5/02* (2006.01)
*H01Q 21/06* (2006.01)
*B22F 3/105* (2006.01)
*H01P 1/02* (2006.01)
*B33Y 70/00* (2020.01)
*B33Y 80/00* (2015.01)

(52) U.S. Cl.
CPC ......... *H01P 11/002* (2013.01); *H01Q 21/064* (2013.01); *B33Y 70/00* (2014.12); *B33Y 80/00* (2014.12); *Y02P 10/25* (2015.11)

(58) Field of Classification Search
USPC ...... 333/1, 12, 202–209, 239, 246, 248, 254
See application file for complete search history.

(56) References Cited

U.S. PATENT DOCUMENTS

| | | |
|---|---|---|
| 2014/0347144 A1 | 11/2014 | Nath et al. |
| 2015/0097743 A1 | 4/2015 | Evans |
| 2015/0097746 A1 | 4/2015 | Wilson et al. |
| 2015/0194718 A1 | 7/2015 | Kildal et al. |
| 2015/0295300 A1* | 10/2015 | Herbsommer .......... H01P 3/122 333/208 |
| 2017/0271744 A1* | 9/2017 | Burke ................ C23C 18/1653 |

OTHER PUBLICATIONS

Geterud, E.G., et al., 'Lightweight waveguide and antenna components using plating on plastics', Proceedings of 2013 7th European Conference on Antennas and Propagation (EuCAP), Apr. 8-12, 2013, pp. 1812-1815. title, abstract; fig.2, 3, 4; p. 1812 Introduction, p. 1813 first column second paragraph.

D'Auria, M., et al., '3-D Printed Metal-Pipe Rectangular Waveguides', IEEE Transactions on Components, Packaging And Manufacturing Technology, vol. 5, No. 9, Sep. 1, 2015, pp. 1339 to 1349 title, abstract; fig.Ia,Ib,2, 3; p. I341-1342 Section III.

Grudiev, A., 'Additive manufacturing.for X-band Applications', CERN Indico-registered meeting, BE-RF, Feb. 5, 2014, [Retrieved from the Internet on Dec. 21, 2015] < https://indico.cern.ch/event/275412/session/8/contribution/36/attachments/498818/6890 Whole of document.

Deffenbaugh, P. I., '3D Printed Electromagnetic Transmission and Electronic Structures Fabricated on a Single Platform Using Advanced Process Integration Techniques', PhD Dissertation, The University of Texas at El Paso, Aug. 2014. Whole of document.

International-Type Search Report and Written Opinion of National Application No. AU2015903914, dated Dec. 23, 2015, 11 pages.

"A W-band waveguide fabricated using selective laser melting" XP055579763 (Koen Van Caekenberghe), Nov. 2012.

Razvan Udroiu1, Powder Bed Additive Manufacturing Systems and Its Applications, Academic Journal of Manufacturing Engineering, 122 vol. 10, Issue Apr. 2012, pp. 122-129.

\* cited by examiner

RF STRUCTURE AND A METHOD OF FORMING AN RF STRUCTURE

RELATED APPLICATIONS

This application is a national phase application filed under 35 USC § 371 of PCT Application No. PCT/AU2016/050903 with an International filing date of Sep. 26, 2016 which claims priority of AU Patent Application 2015903914 filed Sep. 25, 2015. Each of these applications is herein incorporated by reference in its entirety for all purposes.

FIELD OF THE INVENTION

The present invention relates to an RF structure and a method of forming an RE structure.

The invention has been developed primarily for waveguides and antenna components in radar and electronic warfare systems and will be described hereinafter with reference to such applications. However, it will be appreciated that the invention is not limited to these particular fields of use and is also applicable to waveguides and other RF structures used in other RF systems.

BACKGROUND

Any discussion of the background art throughout the specification should in no way be considered as an admission that such art is widely known or forms part of common general knowledge in the field.

Many RF structures are known for transferring RF energy. These structures vary from relatively simple waveguide straights, such as that which extends between an RE source and a radiating antenna, up to multi-piece structures defining complex paths and shapes, including junctions, antennas, feedback loops, and other such structures. It is known to combine a plurality of RE structures to define an RF feed network for a radar system, and for these separate RE structures to include one or more waveguide straights and bends, waveguide couplers, tees, polarisers, filters and waveguide based antennas such as horns, slotted waveguides, multi-fed antenna arrays or combinations thereof.

To gain the desired electromagnetic performance from an RE structure particular care is afforded to the selection of high quality materials and to adhere to tight dimensional tolerances during manufacture. Each RF structure is manufactured typically from mechanical forms such as machinings, extrusions, castings and electroformed structures which are then assembled to define a combined RE structure or an RE feed network by welding, brazing or fastening. Heightened care is taken during assembly to gain suitable junctions between adjacent RE structures and prevent unwanted energy losses or signal attenuation.

The conventional manufacturing and assembling techniques must be tightly controlled and as such the required RE structures are ultimately expensive due to the materials, the fabrication processes, and the skilled labour that must be used. This expense is exacerbated with more complex RE networks, where the assembled combination of RF structures provides many potential mechanical failure points and energy loss points.

A partial answer to the above problems has been provided by Geterud, E. G. et al., in a paper entitled *Lightweight Waveguide and Antenna Components Using Plating on Plastics*. This document discloses the use of autocatalytic electroless plating on plastics for metal-pipe rectangular waveguides. This includes taking a 3-D printed component in plastics and subjecting it sequentially to etching, activation, acceleration, copper deposition to create a participating conductive surface, and the application of a protective surface coating. This relatively complex manufacturing process with many steps making use of many different techniques, materials and technologies, and does not lend itself easily to low cost manufacture.

Accordingly, there is a need in the art for an improved RF structure and a method of forming an RF structure.

SUMMARY OF THE INVENTION

It is an object of the present invention to overcome or ameliorate at least one of the disadvantages of the prior art, or to provide a useful alternative.

According to a first aspect of the invention there is provided an RF structure for transferring RF energy from an RF source to an RF sink, the structure including:
  a first end for accepting the RF energy from the RF source;
  a second end for transferring the RF energy out of the RF structure to the RF sink;
  a body that has been formed using an additive manufacturing process and which extends between the first end and the second end for allowing the RF energy to be transferred between those ends; and
  at least one participating conductive surface formed on the body that has been subjected to at least one surface modification process of etching.

According to a second aspect of the invention there is provided an RF structure for transferring RF energy from an RF source to an RE sink, the structure including:
  a first end for accepting the RF energy from the RE source;
  a second end for transferring the RF energy out of the RE structure to the RE sink;
  a body having an interior surface and an exterior surface, the body having been formed using an additive manufacturing process and which extends between the first end and the second end for allowing the RE energy to be transferred between those ends; and
  at least one participating conductive surface formed on the interior surface, wherein at least part of the exterior and the interior surface has been subjected to at least one surface modification process.

In an embodiment, the at least one participating conductive surface is integrally formed on the body.

In an embodiment, the surface modification process is a subtractive manufacturing process.

In an embodiment, the surface modification process is substantially uniformly applied to the at least one participating conductive surface.

In an embodiment, the body is conductive.

In an embodiment at least one of the first end and the second end are integrally formed with the body.

In an embodiment the first end and the second end are integrally formed with the body.

In an embodiment at least one of the first end and the second end are integrally formed with the body.

In an embodiment the first end and the second end are integrally formed with the body.

In an embodiment the at least one participating conductive surface extends substantially continuously between the first end and the second end.

In an embodiment the body has an interior surface and an exterior surface, and the at least one participating conductive surface is defined at least in part by the interior surface.

In an embodiment the at least one participating conductive surface is defined substantially entirely by the interior surface.

In an embodiment the body is integrally formed and the additive manufacturing is metal powder bed additive manufacturing.

In an embodiment the RF structure defines a waveguide.

In an embodiment the waveguide is one of: a circular waveguide; a rectangular waveguide; a square waveguide; or a complex shape waveguide.

In an embodiment the body or the waveguide body in combination with either or both of the ends defines one or more of the following components: a waveguide straight; a waveguide bend; a waveguide coupler; a waveguide tee; a waveguide short; a waveguide to waveguide flange termination; a waveguide transition; a waveguide loop; a waveguide combiner; a polariser; a filter; a waveguide antenna; a waveguide radiating aperture; a waveguide to PCB transition; and a plurality of any one of the components.

In an embodiment the waveguide antenna includes one or more of: a horn antenna; a slotted waveguide; a multi-feed antenna array; and combinations of such antennas.

In an embodiment one or both of the first end and the second end define respective waveguide transitions.

In an embodiment at least one of the waveguide transitions is a waveguide to coax transition or a waveguide to PCB transition.

In an embodiment the RF source is an environmental source adjacent to the first end.

In an embodiment the first end defines an antenna for receiving the RF energy from the environmental source.

In an embodiment the at least one surface modification process is one or more of: etching; vibratory finishing; and flash surface melting.

In an embodiment the at least one surface modification process involves maintaining the body in a treatment material.

In an embodiment the treatment material is one or more etchant.

In an embodiment the treatment material is one or more abrasive.

In an embodiment substantially all the interior surface has been subjected to the at least one surface modification process.

In an embodiment the exterior surface has been subjected to the at least one surface modification process.

In an embodiment substantially all of the exterior surface has been subjected to the at least one surface modification process.

In an embodiment the exterior surface has been subjected to surface modification process other than the at least one surface modification process.

In an embodiment the exterior surface meets the interior surface at the ends.

In an embodiment the body includes an integrally formed structural member.

In an embodiment the integrally formed structural member is a web member.

In an embodiment the first end defines a first connecting flange for allowing the structure to be mechanically connected to the RF source.

In an embodiment the second end defines a second connecting flange for allowing the structure to be mechanically connected to a downstream structure.

In an embodiment the body defines a third connecting flange for allowing the RF structure to be mechanically connected to a support structure.

In an embodiment the second end defines an antenna.

In an embodiment the RF structure includes a plurality of first ends.

In an embodiment the RF structure includes a plurality of second ends.

In an embodiment the body includes a plurality of pairs of first ends and second ends, the pairs defining, at least in part, respective waveguides.

According to a third aspect of the invention there is provided an RF structure for transferring RF energy from an RF source to an RF sink, the structure including:
  a first end for accepting the RE energy from the RE source;
  a second end for transferring the RF energy out of the RF structure to the RF sink;
  a body that has been formed using an additive manufacturing process and which extends between the first end and the second end for allowing the RF energy to be transferred between those ends; and
  at least one participating conductive surface formed on the body that has been subjected to at least one surface modification process to provide attenuation comparable or better than conventional RE coaxial cable for the RF energy at the frequency of interest.

According to a fourth aspect of the invention there is provided an RF structure for transferring RF energy from an RF source to an RF sink, the structure including:
  a first end for accepting the RF energy from the RF source;
  a second end for transferring the RE energy out of the RE structure to the RE sink;
  a body that has been formed using an additive manufacturing process and which extends between the first end and the second end for allowing the RF energy to be transferred between those ends; and
  at least one participating conductive surface formed on the body that has been subjected to at least one surface modification process such that the surface roughness of the at least one participating conductive surface is reduced.

According to a fifth aspect of the invention there is provided an RF structure for transferring RE energy from an RE source to an RF sink, the structure including:
  a first end for accepting the RF energy from the RF source;
  a second end that is spaced apart from the first end and which defines a connecting flange for mechanically connecting to the RF sink to allow the RF energy to be transferred to the RE sink; and
  a body which extends between the first end and the second end for allowing the RF energy to be transferred to the second end, wherein the body and the ends are integrally formed.

In an embodiment the body includes an integrally formed structural element.

In an embodiment the structural element is a web member.

In an embodiment the first end defines a connecting flange for mechanically connecting to the RF source.

In an embodiment the body is integrally formed through an additive manufacturing process.

In an embodiment the body includes an interior surface that is subjected to at least one surface modification process.

According to a sixth aspect of the invention there is provided an RF structure for transferring RF energy from an RF source to an RF sink, the structure including:
  a first end for accepting the RF energy from the RF source;

a second end for transferring the RE energy to the RF sink; and a body which extends between and which is integrally formed with the first end and the second end for allowing the RF energy to be transferred from the first end to the second end, wherein the body or the body collectively with one or more of the ends also defines at least a first structure and a second structure for transmitting the RF energy, each of the first structure and the second structure being selected from the group including the following components: a waveguide straight; a waveguide bend; a waveguide coupler; a waveguide tee; a waveguide short; a waveguide to waveguide flange termination; a waveguide transition; a waveguide loop; a waveguide combiner; a polariser; a filter; a waveguide antenna; a waveguide radiating aperture; a waveguide to PCB transition; and a plurality of any one or more of the preceding components.

In an embodiment the first structure and the second structure are adjacent to each other.

In an embodiment the first structure and the second structure are spaced apart from one another.

In an embodiment the body defines a third structure that is disposed intermediate the first structure and the second structure, the third structure being selected from the group including: a waveguide straight; a waveguide bend; a waveguide coupler; a waveguide tee; a waveguide short; a waveguide to waveguide flange termination; a waveguide transition; a polariser; a filter; a waveguide antenna; a waveguide radiating aperture; a waveguide to PCB transition; and a plurality of any one of the components.

In an embodiment the RF structure includes a plurality of first ends.

In an embodiment the RF structure includes a plurality of second ends.

In an embodiment the body includes a plurality of pairs of first ends and second ends, the pairs defining, at least in part, respective waveguides.

In an embodiment the body is integrally formed.

According to a seventh aspect of the invention there is provided a method for forming an RF structure, the method including the steps of:

forming a body by an additive manufacturing process, wherein the body extends between a first end and a second end and defines an interior surface that extends between the ends; and subjecting the interior surface to at least one surface modification process of etching.

According to an eighth aspect of the invention there is provided a method for forming an RF structure, the method including the steps of:

forming a body by an additive manufacturing process, wherein the body extends between a first end and a second end and defines an interior surface and an exterior surface that extends between the ends; and subjecting at least a portion of the exterior surface and the interior surface to at least one surface modification process.

In an embodiment the step of forming the body by the additive manufacturing process includes integrally forming the body with metal powder bed additive manufacturing.

In an embodiment the at least one surface modification process includes one or more of: etching; vibratory finishing; and flash surface melting.

In an embodiment the method includes the step of subjecting substantially all of the interior surface to the at least one surface modification process.

In an embodiment the method includes the step of subjecting substantially all the exterior surface to the at least one surface modification process.

In an embodiment the step of subjecting at least a portion of the exterior surface and the interior surface to at least one surface modification process includes immersing the body in a first treatment liquid for a first dwell time.

In an embodiment, after immersing the body in the first treatment liquid, the body is immersed in a second treatment liquid for a second dwell time.

In an embodiment, intermediate being immersed in the first liquid and the second liquid the method includes the step of rinsing the body.

In an embodiment the first treatment liquid and the second treatment liquid are substantially the same. In other embodiments, the first treatment liquid and the second treatment liquid are substantially different.

In an embodiment the first treatment liquid and the second treatment liquid are respective first and second etchants.

In an embodiment, the first dwell time and the second dwell time are different. In other embodiments the first dwell time and the second dwell time are substantially identical.

In an embodiment the method includes the step of subjecting the exterior surface to a surface modification process other than the at least one surface modification process.

In an embodiment the step of forming of the body results in the exterior surface meeting the interior surface at the ends.

Reference throughout this specification to "one embodiment", "some embodiments" "an embodiment", "an arrangement", "one arrangement" means that a particular feature, structure or characteristic described in connection with the embodiment or arrangement is included in at least one embodiment or arrangement of the present invention. Thus, appearances of the phrases "in one embodiment", "in some embodiments", "in an embodiment", "in one arrangement", or "in and arrangement" in various places throughout this specification are not necessarily all referring to the same embodiment or arrangement, but may. Furthermore, the particular features, structures or characteristics may be combined in any suitable manner, as would be apparent to one of ordinary skill in the art from this disclosure, in one or more embodiments or arrangements.

As used herein, and unless otherwise specified, the use of the ordinal adjectives "first", "second", "third", etc., to describe a common object, merely indicate that different instances of objects in a class of objects are being referred to, and are not intended to imply that the objects so described must be in a given sequence, either temporally, spatially, in ranking, in importance or in any other manner.

Unless defined otherwise, all technical and scientific terms used herein have the same meaning as commonly understood by those of ordinary skill in the art to which the invention belongs. The articles "a" and "an" are used herein to refer to one or to more than one (that is, to at least one) of the grammatical object of the article unless the context requires otherwise. By way of example, "an element" normally refers to one element or more than one element. In the claims below and the description herein, any one of the terms "comprising", "comprised of" or "which comprises" is an open term that means including at least the elements/features that follow, but not excluding others. Thus, the term "comprising", when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also a non-exclusive term that also means including at least the elements/features that follow the term, but not excluding others. Thus, "including" is synonymous with and means "comprising".

As used herein, the term "exemplary" is used in the sense of providing examples, as opposed to indicating quality. That is, an "exemplary embodiment" is an embodiment provided as an example, as opposed to necessarily being an embodiment of exemplary quality.

In the context of this patent specification the term "electrical equipment" is intended to refer broadly to electrical and electronic components or combinations of components. This includes electrical cabling and wiring for data, power or other functions, electrical components, either active or passive, circuit boards, and other electrical or electronic components. It will also be appreciated that the singular also includes the plural except where the context otherwise indicates.

BRIEF DESCRIPTION OF THE DRAWINGS

Embodiments of the invention will now be described, by way of example only, with reference to the accompanying drawings in which.

DETAILED DESCRIPTION

Described herein are RF structures and methods of forming such RF structures that are embodied exemplarily.

Figure 1:
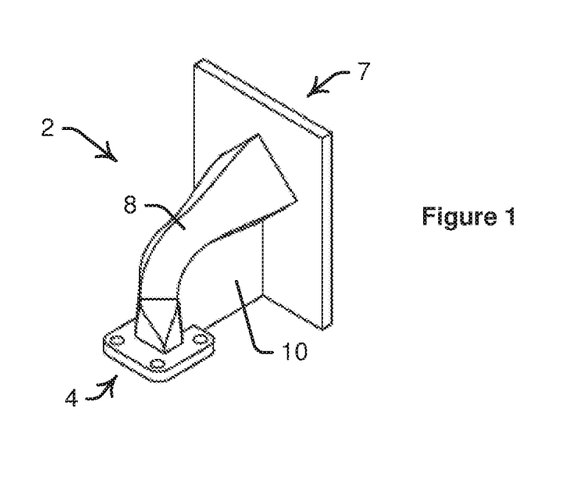
FIG. 1 is a perspective view of a waveguide bend of one embodiment of the invention.
Figure 2:
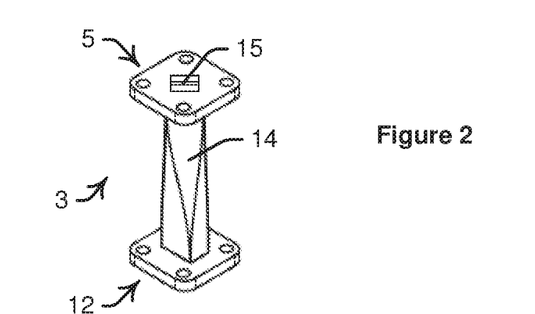
FIG. 2 is a perspective view of a waveguide rectangular to square straight transition of another embodiment of the invention.

Referring to FIG. 1 there is illustrated an RF structure in the form of a waveguide bend 2 for transferring RF energy from an RF source in the form of a waveguide straight 3, as shown in FIG. 2, to an RF sink in the form of an antenna (not shown). Bend 2 includes a generally square integrally formed flanged first end 4 for physically connecting with a like opposed flanged end 5 of straight 3 for accepting the RF energy from straight 3. Bend 2 includes an integrally formed generally rectangular flared second end 7 that is physically connected directly to the antenna for transferring the RF energy out of bend 2 and to the antenna. Bend 2 includes a hollow generally arcuate body 8 that has been formed using an additive manufacturing process and which extends between end 4 and end 7 for allowing the RF energy to be transferred between those ends. Bend 2 includes a participating conductive surface (not shown) that is formed on the entirety of an interior (not shown) of body 8, where the conductive surface extends continuously between ends 4 and 7 and has been subjected to a surface modification process.

The participating conductive surface is integrally formed with body 8. That integral formation on body 8 occurs during the production of body 8 during the additive manufacturing process, which is described below in more detail. Following from the additive manufacturing process, body 8 is, in this embodiment, progressed to a subtractive manufacturing process during which the conductive surface, together with all the other exposed surfaces of body 8, is subjected to the surface modification process.

Ends 4 and 5 each include respective arrays of four spaced apart apertures. In use, ends 4 and 5 are physically abutted such that the arrays of apertures are aligned for receiving fasteners (not shown) that secure ends 4 and 5 together.

Body 8, and ends 4 and 7, include respective exterior surfaces that, while not being participating conductive surfaces, have also been subjected to the surface modification process simultaneously to the interior surface being subject to that process. In other embodiments, however, only the interior surface is subject to the surface modification process. In other embodiments less than all of the exterior surfaces are subjected to the surface modification process, or are subjected to an alternative surface modification process. In still further embodiments less than all of the interior surface is subject to the surface modification process. For example, in some embodiments one or more portions of the interior surface are masked to preclude those portions from the surface modification process.

Body 8 adjacent to ends 4 and 7 is generally rectangular although of different dimensions. Moreover, body 8 undergoes between ends 4 and 7 a 90° bend together with a rectangular to square waveguide transition. Body 8 also includes an integrally formed web 10 for providing additional structural rigidity.

It will be appreciated that in other embodiments different structures with different forms are used. For example, in other embodiments the bend is more or less than 90°, while in further embodiments use is more of more or less than one web, and the body is other than a waveguide transition.

It will be appreciated that body 8 is integrally formed—that is, body 8 is a single piece—and the additive manufacturing is metal powder bed additive manufacturing.

In the above description straight 3 of FIG. 2 is referred to as an RF source for bend 2. In addition, straight 3 is an RF structure according to another embodiment of the invention. More particularly, straight 3 transfers RF energy from an RF source (not shown) to an RF sink in the form of bend 2. Straight 3 includes a generally square integrally formed flanged first end 12 for accepting the RF energy from the RF source and end 5 for transferring the RF energy out of the RF structure to bend 2. A hollow body 14 that has been formed using an additive manufacturing process extends between end 12 and end 5 for allowing the RE energy to be transferred between those ends. A continuous participating conductive surface 15 is formed on the entirety of an interior of body 14 and has been subjected to at least one surface modification process.

In addition to the above, bend 2 and straight 3, when operatively connected, collectively define a further embodiment of an RF structure according to the invention.

Figure 3:
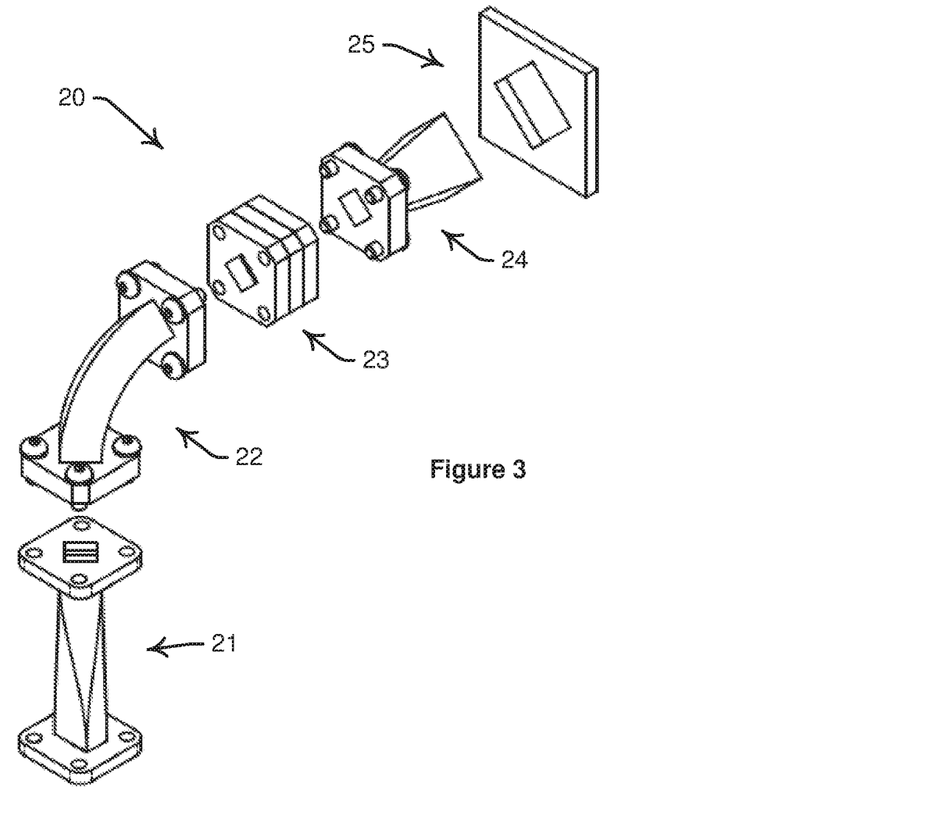
FIG. 3 is an exploded perspective view of a waveguide of having individual components made in accordance with the invention and assembled conventionally.

Reference is made to FIG. 3 where there is illustrated a further embodiment of the invention. In this embodiment the RF structure 20 includes a waveguide straight 21 that is similar to straight 3, a waveguide quarter bend 22, three waveguide spacers 23, a further waveguide straight 24 and a waveguide coupler 25. Each of these individual components of structure 20 have a body that is formed from an additive manufacturing process and at least one participating conductive surface that has been subjected to at least one surface modification process. In use, the separate components are abutted and secured with adjacent components to collectively define a continuous internal participating conductive surface that has been subject to the surface modification process.

It will be appreciated that, in other embodiments, not all of the components of FIG. 3 are formed from an additive manufacturing process. In further embodiments not all of the components of FIG. 3 are subject to the surface modification process.

Figure 4:
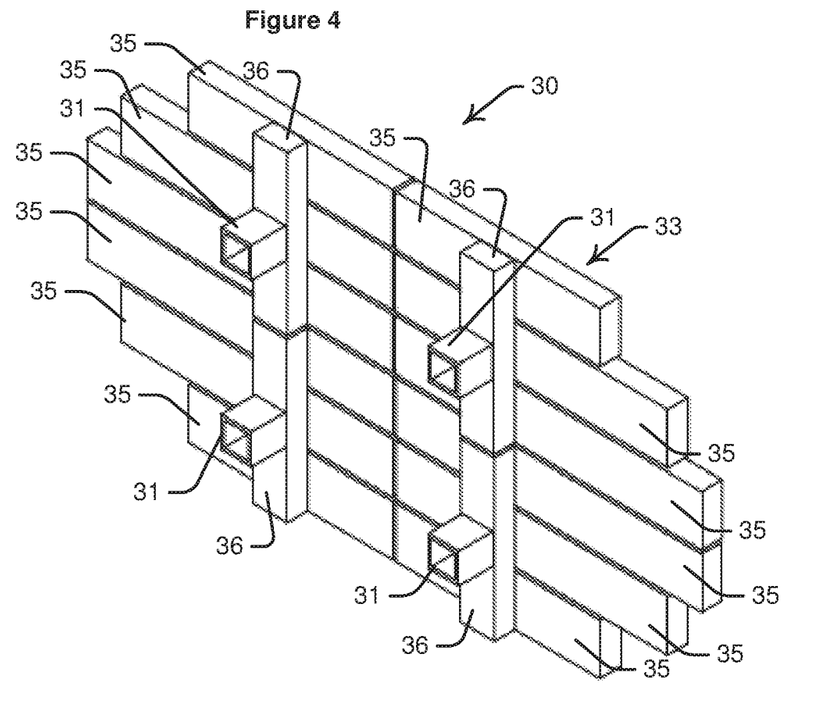
FIG. 4 is a rear perspective view of a slotted waveguide antenna according to another embodiment of the invention.
Figure 5:
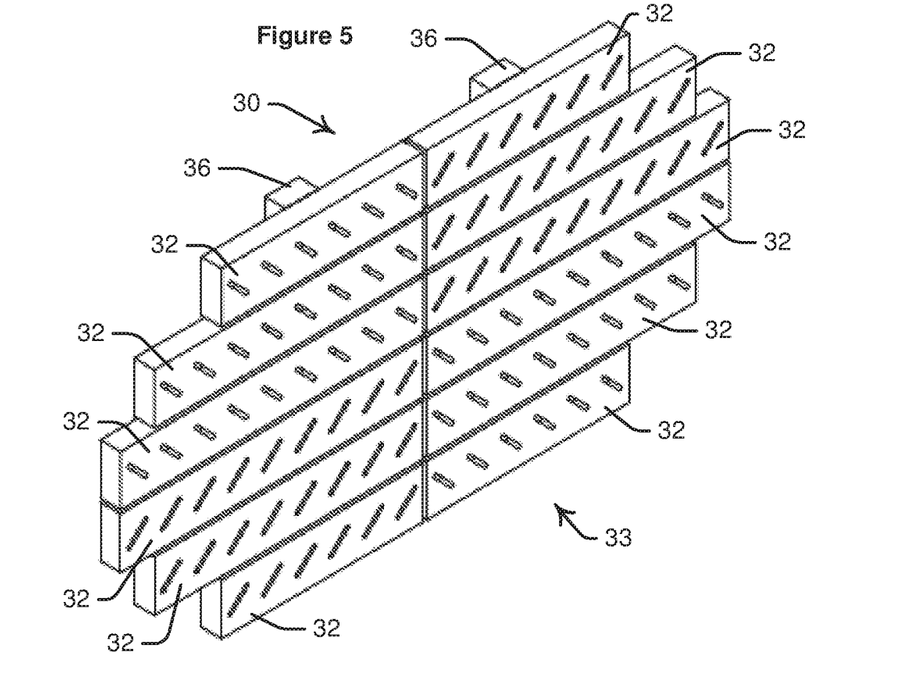
FIG. 5 is a front perspective view of the antenna of FIG. 4.

A further embodiment is illustrated in FIGS. 4 and 5 and provides an RF structure in the form of a slotted waveguide antenna 30. The antenna defines an RF structure for transferring RE energy from an RE source (typically a waveguide, although not explicitly shown) to an RE sink, which in this embodiment, is the environment. Antenna 30 includes a first end in the form of four like spaced apart generally square tubular inlets 31 for accepting the RE energy from the RF source. A second end, in the form of an array of twelve slotted faces 32 transfer the RF energy out of the RF structure to the environment. A tubular body 33 is formed using an additive manufacturing process and extends between inlets 31 and slotted faces 32 for allowing the RF energy to be transferred there between. A continuous participating conductive surface (not shown) is formed on substantially all of an interior of the body and has been subjected to at least one surface modification process.

In other embodiments applicable to antennas, the antenna has is differently configured to the embodiment described above. For example, in other embodiments the antenna has other than four inlets. In some embodiments the antenna has only one inlet, while in more complex antennas use is made of many tens of inputs. It will also be appreciated that the inlet or inlets are able to be formed in other shapes, such as rectangular, circular, ridged or arbitrary shapes. Similarly, in other embodiments a different number of slotted faces 32 are used in a given antenna.

Body 33 includes a plurality of stacked parallel hollow radiating elements 35 having respective exposed front surfaces for each defining one or faces 32. Elements 35 each include interior surfaces that define respective portions of the participating conductive surface.

Body 33 also includes four feed elements 36 that extend normally to a respective inlet 31 and also to the stacked elements 35 for transferring the RF energy from respective inlets 31 to elements 35. Elements 36 each include interior surfaces that define respective portions of the participating conductive surface.

It will be appreciated that all of the various elements of body 33 are integrally formed by an additive manufacturing process. Following from which, all of the interior surfaces of those elements are simultaneously subjected to the same surface modification process. During the latter process, all the exterior surfaces of body 33 are also subject to the same surface modification process.

In other embodiments the first end of antenna 30 includes more or less than four inlets 31. In further embodiments there are other than twelve radiating elements 33.

Figure 6:
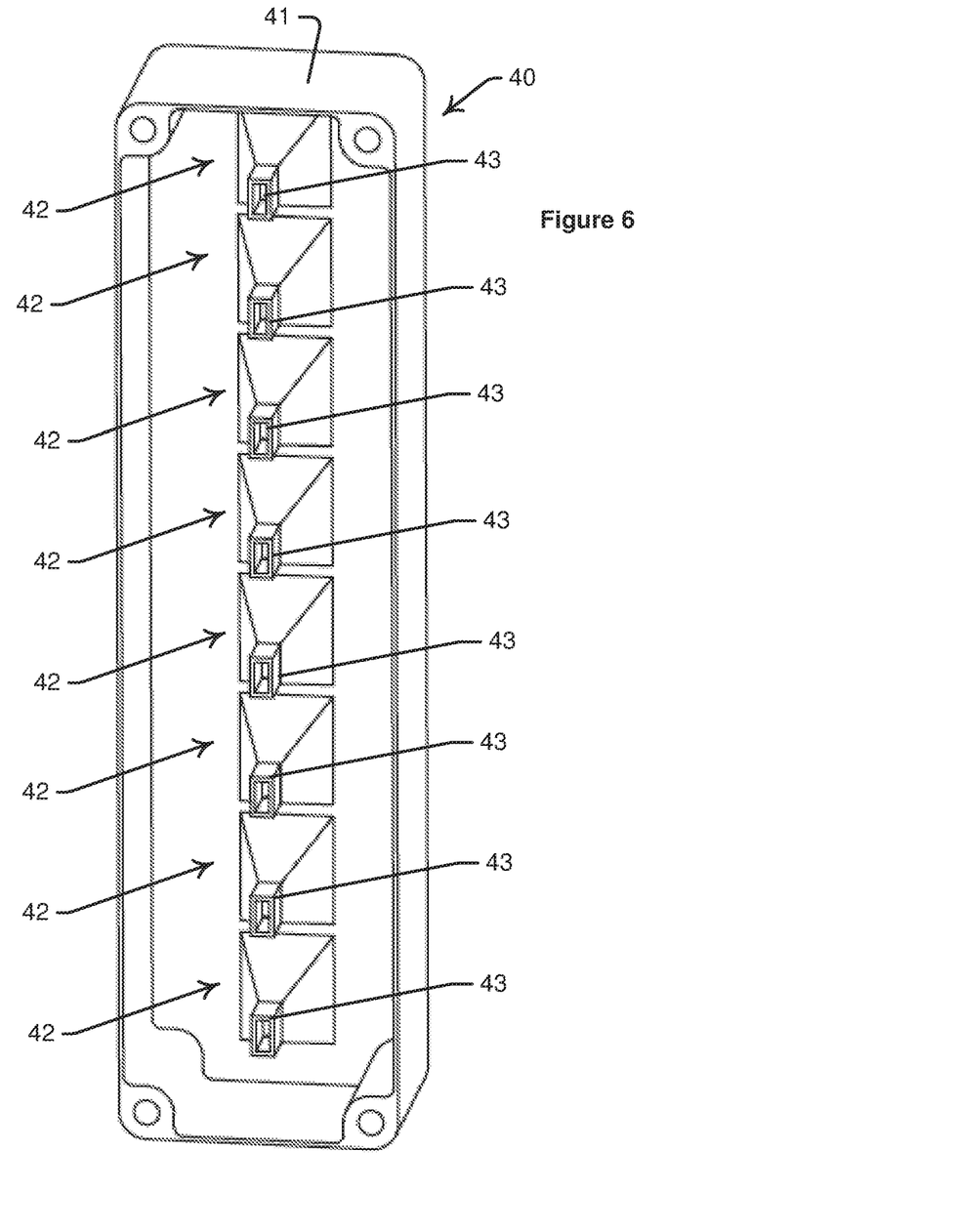
FIG. 6 is a perspective view of an housed integrated antenna array according to the invention.

A further embodiment is illustrated in FIG. 6 where there is provided an RF structure in the form of a housed integrated antenna array 40 for transferring RF energy from an RF source (in this embodiment a waveguide with eight outlets) to an RF sink in the form of the environment. Array 40 includes a unitary housing 41 and eight linearly spaced apart horn antennas 42 that are integrally formed with housing 41. Each antenna 42 includes an inlet 43 for accepting the RF energy from the RF source, and a second end, in the form of the radiating apertures (not shown) for transferring the RF energy out of the RF structure to the environment. The mounted RF source is part of an RF transceiver and antennas 42 are able to receive RF energy from the environment and transfer that back to the transceiver.

Array 40 has been formed using an additive manufacturing process such that all the illustrated elements are integrally formed. Moreover, each antenna extends between respective inlets 43 and the radiating apertures for allowing the RF energy to be transferred between those ends. Antennas 42 have respective interior surfaces that define participating conductive surfaces. These surfaces have been subjected to a surface modification process. More particularly, the interior and exterior surfaces of array 40 have been simultaneously subject to the same surface modification treatment.

Figure 7:
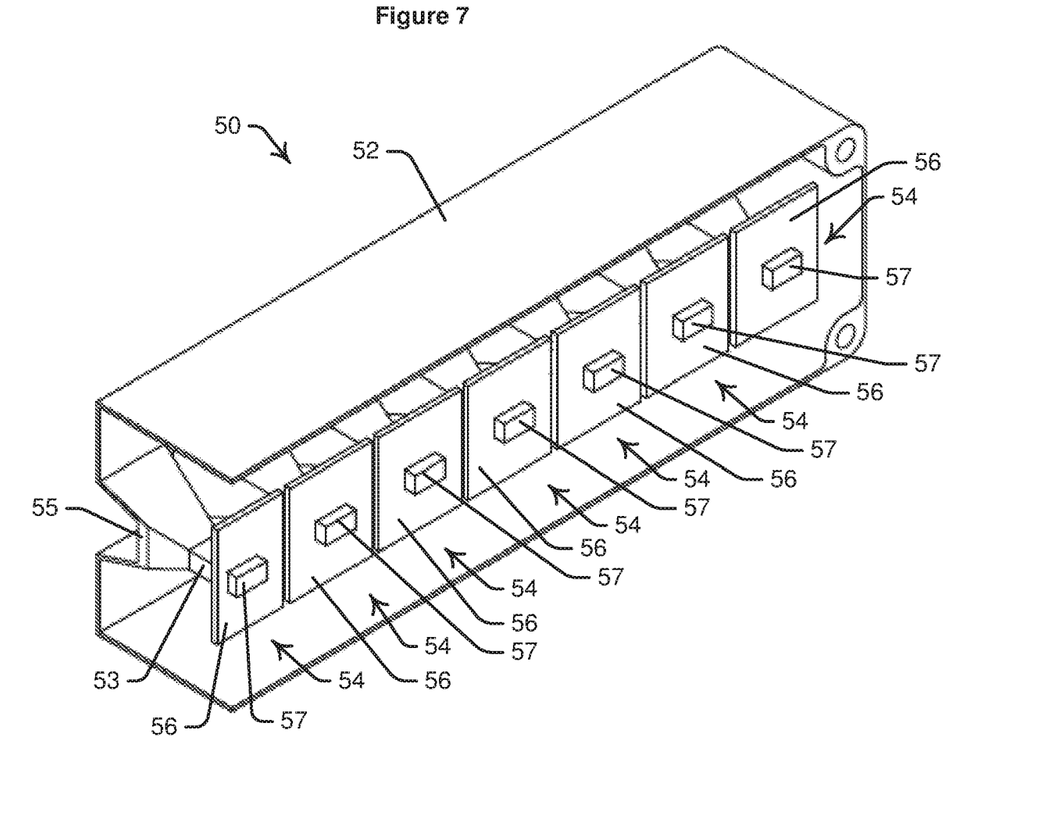
FIG. 7 is a cross sectional perspective view of a waveguide housing with an integrated antenna array and a waveguide transition to a PCB.

Reference is now made to FIG. 7 where there is illustrated a cross sectional perspective view of an RF structure in the form of a waveguide to PCB transition 50 that has been produced by an additive manufacturing process. Transition 50 includes a unitary body 52 for defining seven like spaced apart generally rectangular first ends 53 (only one of which is indicated by a reference numeral) for connecting to respective RF sources in the form of seven PCB RF sources 54. Body 52 also defines seven like spaced apart generally rectangular second ends 55 (only one of which is indicated by a reference numeral) that are connected to respective ends 53 by intervening continuous interior surfaces that define respective participating surfaces. These participating surfaces have all been subject to a surface treatment to reduce the surface roughness. Transition 50 transfers RF energy from RF sources 54 to an RF sink in the form of an antenna 55 and body 52. Sources 54 include respective PCBs 56 having formations (not shown) for abutting with respective ends 53 and for allowing RF energy generated by sources 54 (including that emanating from waveguide shorts 57) to be received in transition 50 for transfer to the antenna. In those embodiments where one or more of sources 54 acts also or instead as an RF receiver, RF energy received by the antenna is transferred to ends 55, and then to ends 53, and then to respective receivers (not shown) on PCBs 56.

Electrical shorts 57 are mounted to PCB 56 together with other electrical components (not shown).

Transition 50 includes a complex shaped multi-tubular body 52 that has been integrally formed using an additive manufacturing process. Body 52 extends between ends 53 and ends 55 for allowing the RF energy to be transferred between those ends, while also extending to form a protective and structural housing about the ends and PCBs 56.

From the above description it will be appreciated that embodiments of the invention vary considerably in form and are applicable to a broad range of applications. One class of such applications is to waveguides such as one or more of: a circular waveguide; a rectangular waveguide; a square waveguide; or a complex shape waveguide. Moreover, the body in combination with either or both of the ends is able to define one or more of the following components: a waveguide straight; a waveguide bend; a waveguide coupler; a waveguide tee; a waveguide short; a waveguide to waveguide flange termination; a waveguide transition; a waveguide loop; a waveguide combiner; a polariser; a filter; a waveguide antenna; a waveguide radiating aperture; a waveguide to PCB transition; and a plurality of any one of the components.

Another class of application is to a waveguide antenna such as one or more of: a horn antenna; a slotted waveguide; a multi-feed antenna array; and combinations of such antennas.

Another class of application is to waveguide transitions, such as a waveguide to coax transition or a waveguide to PCB transition. A further class of applications is to waveguide thermal control and thermal dissipation structures such as air or gas cooled, liquid cooled or phase change heat sinks and structures. This class of application are able to be manufactured integrally with other parts of the waveguide, or manufactured separately and connected or otherwise mounted to other waveguide components.

Embodiments of the invention have been developed to facilitate the manufacture of a waveguide based antenna feed structure, which includes the following RF components:

straight waveguide.
waveguide to waveguide flange termination and vice versa.
waveguide bends.
to circular waveguide transitions and vice versa.
Circular waveguide bends.
to square waveguide transitions and vice versa.
Square waveguide bends.
Diagonal Gaussian horn antenna.
Rectangular exponential horn antenna.
Conical exponential horn antenna.
Square waveguide iris polariser.
Antennas integrated into a facia panel or external structure.

Each of the above RF components is manufactured separately to define respective RF structures in accordance with the invention. In other embodiments a subset of the RF components are collectively integrally manufactured to define a single RF structure according to the invention which is combined with the other required components/structures to define the overall RF structure. In still further embodiments, all the components are collectively integrally manufactured.

While the above embodiment was designed for operation at a structure specific frequency, other embodiments of the invention are found in other bands, including across IEEE radio frequency bands from UHF to W Band inclusive (300 MHz to 111 GHz).

It should also be noted that the body of the RF structure includes, at least on some embodiments, one or more an integrally formed structural members such as a web member. Moreover, in some embodiments one or both of the ends defines a respective connecting flange for allowing the structure to be mechanically connected to an adjacent RE structure. In further embodiments the body defines a further connecting flange for allowing the RF structure to be mechanically connected to a support structure.

Additionally, in different embodiments the RF structures include different numbers of first ends and second ends to collectively define a single waveguide or which collectively provide more than one waveguide.

The RF structure 20 of FIG. 3 was initially designed the using Autodesk® Inventor to create a 3D representation of the individual RF components. This 3D model was then converted to an STL file format suitable for submission into a target additive manufacture platform. In this embodiment use was made of a metal powder bed additive manufacture process and, more particularly, of a process carried out on a Powder Bed Metal Laser Sintering machine. The separate RF components were sequentially manufactured in the machine from aluminium.

After removal from the machine the individual RF components are subject to a surface modification process. In this embodiment the surface modification process was a subtractive manufacturing process conducted by etching using caustic alkaline etchant. The individual RF components were placed in an etch bath and immersed in the etchant for an etch duration. This etch duration depends on the accessibility of interior surfaces, being longer for larger and more elongate interior surfaces. It will be appreciated by those skilled in the art that other etch durations are available, and will vary depending upon the material used in the RF components, the type and concentration of the etchant, and the surface modification required, amongst other such factors.

As each RF component is immersed in the etchant both the interior and exterior surface are subject simultaneously to the surface modification process. This is a preferred methodology as it simplifies the equipment required to manufacture the components and better accommodates automation, consistency and repeatability across a wide range of components having both linear and non-linear participating surfaces.

In other embodiments only the interior surface is subject to the surface modification process as that interior surface defines the participating conductive surface for the RE component.

It has been found that even for intricately shaped bodies, defining one or more small internal channels, it is possible to obtain performance gains. In one preferred embodiment, a first treatment fluid is a sodium hydroxide chelating agent known as Henkel Aluminux and a first dwell time for the body in the etchant is between one and two hours. In this embodiment, there is also a second, third and fourth treatment fluids, all being the same as the first treatment fluid although maintained in separate etchant baths for sequentially receiving the body. The second, third and fourth dwell times are also between one and two hours to allow for a continuity in the sequential manufacture of a plurality of the bodies.

In other embodiments use is made of more or less than four treatment fluids.

In other embodiments, the dwell times are other than between one and two hours. Moreover, the different dwell times need not be the same duration.

In some embodiments, use is made of a first treatment fluid only in a single etchant bath, and the body is cycled through the first fluid multiple times.

Preferentially, after being subject to a treatment fluid, the body is rinsed and/or deoxidised.

The use of one or more etchants provides for a substantially uniform treatment of the participating conductive surface and, in fact, the whole interior and exterior surfaces of the body. The process is also very accommodative of different and complex shapes, and even for very complex unitary bodies, having only small internal passages with multiple bends and turns, the etchant is able to gain access to the relevant surfaces and substantially uniformly affect the surface treatment. For particularly complex components, with long and narrow participating surfaces, preferential use is made of multiple etchants, or multiple immersions of the body in the one etchant, to optimise the surface treatment. In other embodiments, turbulence is introduced to the etchant during the dwell time to reduce the risk of unevenness in the surface treatment. Such turbulence is able to be induced by a gentle reciprocating or rocking movement of the bath in which the etchant is contained. In other embodiments use is made of other means, including a direct mechanical agitation of the etchant in the bath.

In other embodiments different surface modification processes are used. In some embodiments the surface modification process involves, like the above described process, maintaining the RF structure in a treatment material. While in the above described embodiment the treatment material is one or more etchants, in other embodiments use is made of other treatment materials such as one or more abrasives. For example, in some embodiments use is made of vibration processing by submerging an RF structure in 46 or 180 grit aluminium oxide and subjecting the structure and grit to vibration at 50 to 100 Hz and 5 to 50 G for more than two hours. In further embodiments different grit sizes are used as well as different frequencies to gain the required modification of the surface.

In other embodiments at least one of the RF components is sequentially immersed in two or more etch baths making use of respective etchants. Between immersions in the successive baths the RF component is rinsed to prevent contamination from one bath to the next.

Another surface modification process includes flash melting of a surface layer of the RF structure by using a very high temperature energy source for a short amount of time. For example, in some embodiments use is made of an oxygen-acetylene torch or an argon plasma source to achieve the surface modification process.

Accordingly, the at least one surface modification process used in the embodiments is one or more of: etching; vibratory finishing; and flash surface melting. Preferentially substantially all the interior surface has been subjected to the at least one surface modification process, and in some embodiments the exterior surface has also been subjected to the at least one surface modification process.

The main advantages of the embodiments described above include:
  The same or greater performance without having to rely upon highly skilled manual labour.
  Reproduce-able performance.
  The substantially uniform treatment of all of the participating surface or surfaces.
  Cost-effective.
  Small components are able to be accurately manufactured.
  New design flexibility provided to allow for better use of space limitations that apply when installing RF structures into satellites, or for retrofitting such equipment into vehicles and aircraft.
  Lighter weight RF components possible.
  More reliable manufacturing output possible due to automation.
  Reduced part count achievable as complex shapes are able to be integrally formed with each other while still having a common participating conductive surface of the desired characteristics.
  Higher performance available.

In addition to more general waveguide applications, the embodiments of the invention are applicable to terrestrial communications, satellite communications (SATCOM), on-orbit radio communications, radar, and electronic Warfare (EW).

It will be appreciated that the disclosure above provides various significant RE structures and methods of forming such structures.

In other embodiments there is provided an RF structure for transferring RF energy from an RF source to an RF sink, the structure including:
  a first end for accepting the RE energy from the RE source;
  a second end for transferring the RF energy out of the RF structure to the RF sink;
  a body that has been formed using an additive manufacturing process and which extends between the first end and the second end for allowing the RF energy to be transferred between those ends; and
  at least one participating conductive surface formed on the body that has been subjected to at least one surface modification process to provide attenuation comparable or better than conventional RE coaxial cable for the RF energy at the frequency of interest.

It has been found that the surface modification process in combination with the additive manufacturing process allows individual components or combinations of components to be produced which offer performance as good as or better than conventional coaxial cable and which are able to be formed into more effective shapes that offer not just good transmission characteristics, but also superior packaging, power and structural properties.

Further embodiments of the invention provide an RF structure for transferring RF energy from an RE source to an RE sink, the structure including:
  a first end for accepting the RE energy from the RE source;
  a second end for transferring the RF energy out of the RF structure to the RF sink;
  a body that has been formed using an additive manufacturing process and which extends between the first end and the second end for allowing the RF energy to be transferred between those ends; and
  at least one participating conductive surface formed on the body that has been subjected to at least one surface modification process such that the surface roughness of the at least one participating conductive surface is reduced.

It has been found that the surface modification process in combination with the additive manufacturing process allows individual components or combinations of components to be produced easily, notwithstanding the use of complex forms, which offer the required energy transfer performance. These advantages became available due to the appreciation by the inventors of the cost-effective combination of the two different processes to provide a conductive surface of reduced roughness.

Even further embodiments of the invention provide an RF structure for transferring RF energy from an RE source to an RF sink, the structure including:
  a first end for accepting the RE energy from the RE source;
  a second end that is spaced apart from the first end and which defines a connecting flange for mechanically connecting to the RF sink to allow the RF energy to be transferred to the RF sink; and
  a body which extends between the first end and the second end for allowing the RF energy to be transferred to the second end, wherein the body and the ends are integrally formed.

According to even further embodiments of the invention there is provide an RF structure for transferring RE energy from an RE source to an RE sink, the structure including:
  a first end for accepting the RE energy from the RF source;

a second end for transferring the RF energy to the RE sink; and a body which extends between and which is integrally formed with the first end and the second end for allowing the RF energy to be transferred from the first end to the second end, wherein the body or the body collectively with one or more of the ends also defines at least a first structure and a second structure for transmitting the RF energy, each of the first structure and the second structure being selected from the group including the following components: a waveguide straight; a waveguide bend; a waveguide coupler; a waveguide tee; a waveguide short; a waveguide to waveguide flange termination; a waveguide transition; a waveguide loop; a waveguide combiner; a polariser; a filter; a waveguide antenna; a waveguide radiating aperture; a waveguide to PCB transition; and a plurality of any one or more of the preceding components.

These embodiments are specifically advantageous for providing for complex shapes with minimal connections. That is, very elaborate waveguides (with multiple inputs, outputs and feedback loops, for example) are able to be manufactured as a single piece with a single continuous interior participating surface of substantially uniform roughness.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term "coupled" or "connected", when used in the description and claims, should not be interpreted as being limited to direct connections only. The terms "coupled" and "connected," along with their derivatives, may be used. It should be understood that these terms are not intended as synonyms for each other. Thus, the scope of the expression "a device A coupled to a device B" should not be limited to devices or systems wherein an output of device A is directly connected to an input of device B. Rather, it means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas or flowcharts provided are merely representative of procedures that may be used. Functionality may be added or deleted from the block diagrams and operations may be interchanged among functional blocks. Steps may be added or deleted to methods described within the scope of the present invention.

What is claimed is:

1. An RF structure configured for transferring RF energy from an RF source to an RF sink, the RF structure including:
    a first end configured for accepting the RF energy from the RF source;
    a second end configured for transferring the RF energy out of the RF structure to the RF sink;
    a metal body having an interior surface and an exterior surface, the metal body having been formed from a conductive metal by 3D printing and which extends between the first end and the second end, the metal body being configured for transferring the RF energy between the first and second ends; and
    wherein a roughness of at least one participating region of the interior surface has been reduced by at least one surface modification process that provides a substantially uniform treatment of the at least one participating region.

2. The RF structure according to claim 1, wherein the at least one surface modification process is a subtractive manufacturing process.

3. The RF structure according to claim 1, wherein the at least one participating region of the interior surface includes the entire interior surface.

4. The RF structure according to claim 1, wherein the metal body is integrally formed.

5. The RF structure according to claim 1, wherein the metal body includes an integrally formed structural member.

6. The RF structure according to claim 1, wherein:
    the metal body extends between and is integrally formed with the first end and the second end; and
    the metal body or the metal body collectively with one or more of the ends also defines at least a first structure and a second structure for transmitting the RF energy, each of the first structure and the second structure being selected from any one or more of a group consisting of:
        a waveguide straight;
        a waveguide bend;
        a waveguide coupler;
        a waveguide tee;
        a waveguide short;
        a waveguide to waveguide flange termination;
        a waveguide transition;
        a waveguide loop;
        a waveguide combiner;
        a polariser;
        a filter;
        a waveguide antenna;
        a waveguide radiating aperture; and
        a waveguide to PCB transition.

7. The RF structure according to claim 6, wherein the metal body defines a third structure that is disposed intermediate the first structure and the second structure, the third structure being selected from any one or more of a group consisting of:
- a further waveguide straight;
- a further waveguide bend;
- a further waveguide coupler;
- a further waveguide tee;
- a further waveguide short;
- a further waveguide to waveguide flange termination;
- a further waveguide transition;
- a further polariser;
- a further filter;
- a further waveguide antenna;
- a further waveguide radiating aperture; and
- a further waveguide to PCB transition.

8. The RF structure according to claim 6, wherein the metal body is integrally formed.

9. The RF structure according to claim 1, wherein the at least one surface modification process includes the surface modification process of etching.

10. The RF structure according to claim 1, wherein the metal body is formed using metal powder bed 3D printing.

11. A method of forming an RF structure, the method including the steps of:
    forming a metal body from a conductive metal by 3D printing, wherein the metal body extends between a first end and a second end and defines an interior surface and an exterior surface that extend between the ends; and
    reducing a roughness of at least a participating portion of the interior surface by subjecting the participating portion to at least one surface modification process that provides a substantially uniform treatment of the participating portion.

12. The method according to claim 11, wherein the step of forming the metal body results in the exterior surface meeting the interior surface at the ends.

13. The method according to claim 11, wherein the at least one surface modification process includes exposing the participating portion of the interior surface to an etching solution.

14. The method of claim 13, wherein the at least one surface modification process includes subjecting the participating portion of the interior surface to a plurality of exposures the etching solution.

15. The method of claim 13, wherein the at least one surface modification process includes introducing turbulence into the etching solution while the participating portion of the interior surface is exposed to the etching solution.

16. The method according to claim 11, wherein forming the metal body by an additive manufacturing process includes forming the metal body using metal powder bed 3D printing.

17. The method of claim 11, wherein subjecting the participating portion of the interior surface to at least one surface modification process includes submerging the participating portion of the interior surface in an abrasive and subjecting at least one of the abrasive and the participating portion of the interior surface to vibration.

18. The method of claim 11, wherein subjecting the participating portion of the interior surface to at least one surface modification process includes flash melting the participating portion of the interior surface.

* * * * *